United States Patent [19]

Stickels et al.

[11] 4,191,599
[45] Mar. 4, 1980

[54] METHOD OF HEAT TREATING HIGH CARBON ALLOY STEEL PARTS TO DEVELOP SURFACE COMPRESSIVE RESIDUAL STRESSES

[75] Inventors: Charles A. Stickels, Ann Arbor; Adam M. Janotik, Grosse Ile, both of Mich.

[73] Assignee: Ford Motor Company, Dearborn, Mich.

[21] Appl. No.: 942,104

[22] Filed: Sep. 13, 1978

[51] Int. Cl.$^2$ .............................................. C21D 1/48
[52] U.S. Cl. ...................................... 148/16.5; 148/39
[58] Field of Search ................................. 148/16.5, 39

[56] References Cited

U.S. PATENT DOCUMENTS

| 2,299,138 | 10/1942 | Gier | 148/16.5 |
| 3,117,041 | 1/1964 | Koistiner | 148/39 |
| 3,385,739 | 5/1968 | Davis | 148/39 |
| 3,922,181 | 11/1975 | Woodilla et al. | 148/16.5 |

*Primary Examiner*—L. Dewayne Rutledge
*Assistant Examiner*—John P. Sheehan
*Attorney, Agent, or Firm*—Joseph W. Malleck; Olin B. Johnson

[57] ABSTRACT

A method of developing compressive residual stresses in the surface region of a high carbon steel alloy article is disclosed. The article is made of an alloy having 0.8–1.6% C, 0.2–5% Cr, 0–20% ingredients selected from the group consisting of $M_N$, V, Mo, W, Si, and the remainder Fe. The article is heated in a carburizing atmosphere at 800°–950° C. for 1–2.5 hours, and then quenched to cool the central core of the article at a rate sufficiently fast to suppress the formation of non-martensitic austenite decomposition products, thereby establishing a residual compressive stress gradient proceeding from the surface to a depth of 0.007–0.03 inches.

22 Claims, 7 Drawing Figures

METHOD OF HEAT TREATING HIGH CARBON ALLOY STEEL PARTS TO DEVELOP SURFACE COMPRESSIVE RESIDUAL STRESSES

BACKGROUND OF THE INVENTION

It is well-known that the state or degree of residual stresses present in a machine part subject to bending or contact loading can have a major influence on its service life. Much effort has been devoted toward developing compressive surface residual stresses by shot peening, surface rolling and by heat treatments such as carburizing, carbonitriding and nitriding. Descriptions of many of these methods are included in the following publications which are incorporated herein by reference:

(1) J. O. Alman and P. H. Black, "Residual Stress and Fatigue in Metals", McGraw-Hill Book Co., New York, 1963, Chapters 5 and 14.

(2) G. M. Rassweiler and W. L. Grube (Editors), "Internal Stresses and Fatigue in Metals", Elsevier Publishing Co., New York, 1959, pp. 110-119.

(3) Metals Handbook, Vol. 11, 8th Edition, American Society for Metals, Metals Park, Ohio, 1964, "Case Hardening of Steel".

(4) Carburizing and Carbonitriding", American Society for Metals, Metals Park, Ohio, 1977, pp. 86-92.

Each of the above known methods of developing compressive surface residual stresses when applied to high carbon steels have their attendant disadvantages. For example, shot peening and surface rolling are disadvantageous because of limitations as to (a) material hardness, (b) size and shape of part, and (c) resulting surface finish that cannot meet all requirements. Nitriding at temperatures of 1100° F. and below is usually economical only as a shallow surface treatment and therefore disadvantageous. Carbonitriding or nitriding, while steel is in an austenitic condition, requires simultaneous control of both carbon and nitrogen potentials in the gas phase; it is difficult to accurately control the potentials and therefore it is frequently overdone, producing high levels of retained austenite along the part surface which is disadvantageous. As to carburizing, it is generally assumed that it is not possible, by diffusing more carbon into the surface of a high carbon alloyed steel, to produce compressive residual surface stresses (see 14th International Colloqium on Heat Treating, 1972, p. 11).

Carburizing techniques are nearly always applied to low carbon, low alloy steels, such as AISI 8620, 4118 and 4620, which contain 0.1-0.3 wt. pct. carbon. For hypereutectoid steels, austenitized at temperatures too low to dissolve all carbides, an effective equilibrium is established between undissolved carbide and the austenite, which is then saturated in carbon. It is also generally accepted that this saturation prevents such steel from accepting additional dissolved carbon, and thereby prevents an increase in the amount of carbon dissolved in the austenite near the surface. Therefore, an appreciation of carburization with respect to hypereutectoid alloy steels, has remained an unexplored area until this invention.

This is not to say that the prior art has not employed heat treatment methods to produce compressive residual surface stresses in hypereutectoid alloy steels, but they have been carried out by methods which have required the addition of ammonia to the austenitizing furnace atmosphere, which in turn causes nitrogen to be dissolved in the surface layers of the steel. The goal of using such atmosphere is to increase the nitrogen content of the austenite surface, but at the same time avoiding the formations of nitrides of iron or other alloying elements. Ammonia atmospheres present special equipment requirements which it is desirable to avoid and present control problems as to nitride avoidance.

SUMMARY OF THE INVENTION

A primary object of this invention is to provide an improved method for developing compressive residual stresses at the surface zone of a hypereutectoid (0.8-1.6 wt. pct. carbon) alloy steel, which method is lower in cost than that now employed by the prior art and has increased convenience of use by not requiring special furnace equipment.

Another object of this invention is to provide a method in accordance with the above object which inherently increases the contact fatigue resistance of a steel part.

Yet still another object of this invention is to provide an economical method for increasing the surface hardness of hypereutectoid (0.8-1.6%C) alloy steel without requiring a corresponding increase in the bulk hardness of the steel, thus retaining the toughness characteristic of the other lower hardness material.

Specific features pursuant to the above objects typically comprise (a) controlling the hypereutectoid alloy steels to contain 0.8-1.6 wt. pct. carbon and 1.0-4.5 wt. pct. chromium, (b) increasing the austenitizing time during heat treatment to a period of about 1 hour, and (c) regulating the austenitizing furnace atmosphere to obtain a high carburizing potential typical of conventional gas carburizing (see FIG. 12-2 of reference 4), said heat treatment atmosphere particularly being a gas blend of an endothermic gas and 3-10% methane.

DETAILED DESCRIPTION

Steels used in ball and roller bearings are of the following types: (1) high carbon, low alloy steel, such as AISI 52100 (1%, C, 1.5% Cr) through-hardened by heating to typically 825°–850° C., quenching and tempering, (2) low carbon, low alloy steel such as AISI 8620, 4118 and 4620 hardened by carburizing the surface (to maximum surface carbon contents on the order of 1%), quenching and tempering, and (3) high carbon, high alloy steel such as M-50, a tool steel, or 440C, a stainless steel, used when elevated surface temperatures or other extreme operating conditions are anticipated.

Type (2) bearing steels, as indicated above, have one distinct advantage in that substantial compressive residual stress can be developed at the part surface as a consequence of carburizing. The favorable residual stress distribution is thought by the prior art to make a significant contribution to the durability of the bearing. However, compressive residual stresses are not produced when steels of types (1) and (3) are hardened by the indicated conventional through-hardening techniques used by the prior art. Carburizing has not been considered as a means of developing compressive surface residual stresses in types (1) and (3) bearing steels, since it has been generally accepted by the prior art that it is not possible to increase the surface dissolved carbon content by diffusing additional carbon into a hypereutectoid alloy steel from a furnace atmosphere at the usual austenitizing temperatures. This is evidenced by an article presented at the 14th International Colloquim on Heat Treating by Mrs. Stefania Baicu of the Institute of Technological Research for Machine Building in Romania. In an article entitled "Contributions to the Influence of Compressive Stresses generated by Heat Treatment on the Fatigue Life of Parts Under Rolling Contact Wear", on page 2 of the conference preprints published in 1972, she states "in a through-hardening steel, in which the martensitic transformation takes place throughout the whole section of the part as a result of its high carbon content, there could not have been question to diffuse more carbon in the surface layers in order to lower the Ms temperature". This means that the possibility of lowering the Ms temperature through the addition of carbon to the surface layers (thereby inducing compressive residual stresses) is not possible.

Accordingly, the prior art has turned to one other possibility for improving the compressive surface stresses in a high carbon through-hardened steel by heat treatment. Koistinen (see U.S. Pat. No. 3,117,041, and an article appearing in ASM Transactions, vol. 57, pp. 581–588, 1964) as well as the aforementioned paper by Mrs. Baicu, suggests adding ammonia to the austenitizing furnace atmosphere, causing nitrogen to be dissolved in the surface layers of a high carbon through-hardened steel, such as 52100 steel, thereby inducing residual surface compressive stresses upon quenching. This is a kind of nitriding process where the goal is to increase the nitrogen content of the austenized surface, but to avoid forming nitrides of iron or other alloying elements. Although this process has met with some degree of success, it carries certain disadvantages such as the cost of adding the ammonia treatment step and the difficulty of controlling the quantity of nitrogen absorbed by the steel to the amount desired. An excess of nitrogen in the surface layers can lead to certain difficulties, e.g., low hardness due to excessive amounts of retained austenite, or, in extreme cases, grain boundary porosity due to internal nitrogen evolution.

The present invention provides for an economical and controllable method of increasing the fatigue life of a bearing by (a) providing compressive residual stresses in the surface of the steel specimen by a simple heat treatment in a carburizing atmosphere, (b) providing increased retained austenite in said surface zone, (c) providing an increased volume fraction of primary carbides near the surface, and (d) providing higher hardness near the surface, which is in part dependent on limiting and controlling the chromium content of the steel. The heat treatment can be carried out at a relatively low temperature in a carburizing atmosphere, and is best conducted for critical periods of time between 1 and 2 hours. The aim of this treatment is to establish a gradient normal to the surface of dissolved carbon in austenite. Since the typical austenitizing temperature is too low to cause all of the carbides initially present in the steel to dissolve, it is not obvious why carburizing should produce residual surface compressive stresses. If the austenite is saturated in carbon (because all the carbides cannot dissolve), how is it possible to establish a gradient in dissolved carbon by dissolving more carbon at the surface? The prior art has been unable to do so or has believed it is not worthwhile trying to do so.

It is theorized in accordance with this invention that the austenite in a plain carbon hypereutectoid steel, a steel with negligible alloy content, heated to a temperature not high enough to dissolve all of its iron carbides, rapidly becomes saturated in carbon. If carbon is supplied to the steel from the furnace atmosphere, the volume fraction of undissolved carbide (primary carbide) increases, but the amount of carbon dissolved in the austenite is unchanged. However, a hypereutectoid steel containing an alloying element such as chromium, whose affinity for carbon is greater than the affinity or iron for carbon, held at a temperature high enough to form austenite, but too low to dissolve all carbides, slowly redistributes its carbon and chromium between carbide and austenite phases. After a period of several hours (as opposed to several minutes in a plain carbon steel), effective equilibrium is established and the austenite becomes "saturated" in carbon, but saturated only with respect to carbides of the composition with which it coexists. When carbon is added to the steel from a furnace atmosphere, the volume fraction of primary carbides increases near the surface. As more carbide forms, the remaining austenite becomes depleted in chromium, because, proportionately, more chromium than iron goes to form the new carbide. As the chromium content oi the austenite is lowered, its solubility for carbon increases, thereby allowing a surface-to-center gradient in dissolved carbon content to be produced. Within the two phase field (austenite and cementite) of the C-Cr-Fe system, increasing the carbon content of the system increases the carbon content of the austenite. This effect is especially marked for chromium contents of 5% or less.

Another factor contributing to the development of a dissolved carbon gradient is the slowness with which the equilibrium distribution of carbon between carbide and austenite is approached in a steel like AISI 52100. In short treatments (up to 2 hours at 850° C.) of well-spheroidized steel, the carbon content of the austenite never attains its equilibrium value. Thus, it is possible according to this invention to establish an even larger surface-to-center difference in dissolved carbon content than is indicated by the phase diagram. This also has not been appreciated heretofore.

Carburized high carbon alloy steels containing controlled chromium will contain a larger fraction of primary carbides near the surface than in the interior. Since the carbide phase exhibits no abrupt volume change on cooling (such as occurs when austenite forms martensite) and since the volume change can be a source of the residual stresses which develop, the higher carbide fraction at the surface should moderate any residual stresses which do develop.

A preferred mode for carrying out the present invention is as follows:

1. Substrate preparation: The steel article to be subjected to heat treatment should be selected to have a carbon content in the range of 0.8–1.6% carbon and should contain chromium between 0.8–5%; other alloying ingredients may be selected from the group typically consisting of molybdenum, vanadium, tungsten, manganese. The total alloy content can range from 0.75–25%.

2. Austenitizing heat treatment: The substrate or article is then heated to an austenitizing temperature within a carburizing atmosphere for a period of time between 1 and 2 hours to develop the highest surface compressive residual stresses. Longer treatment times produce thicker compressively-stressed layers, but stresses of less intensity. The carburizing atmosphere preferably should have a carbon potential sufficiently high to cause carbon saturation in a 0.0025" thick iron foil in 30 minutes. The full range of carbon potential cannot adequately be conveyed by specifying $CO/CO_2$ ratio because the equilibrium $CO_2$ content varies with temperature for different carbon potentials and will vary from furnace to furnace, different flow rates, and the amount of metal charged. Thus, the shim stock empirical test method is best, using thin foil (see reference 4, page 1 herein).

Such an atmosphere is preferably derived by using an endothermic gas atmosphere, consisting primarily of CO, $H_2$ and $N_2$, generated by the partial combustion of a hydrocarbon. The carbon potential can be adjusted by varying the proportions of air and hydrocarbon at the gas generator to match the carbon content of the part. But it is most important that such endothermic gas contain additional hydrocarbon, preferably by the addition of 3–10% methane. The added hydrocarbon in the form of methane contributes the necessary carburizing capacity to the furnace atmosphere. It is not sufficient to merely provide an endothermic gas of a high carbon potential to the austenitizing furnace (customarily referred to as an endothermic atmosphere "neutral" to a high carbon steel), but rather a carburizing gas blend, endothermic gas plus 3–10% methane, for example, must be employed.

When the substrate contains chromium at the high end of the controlled range, it is desirable that the oxygen content of the gas atmosphere should be reduced so that the formation of chromium oxide on the part surface will not interfere with carburizing. This may be obtained by controlling the gas atmosphere to contain nitrogen and methane in the proper proportions for achieving results equivalent to the results from an endothermic gas based carburizing atmosphere. Vacuum carburizing is another method of carburizing without forming oxides.

3. Quenching: The heated substrate or article is then subjected to cooling by conventional means, to produce the desired microstructure in the steel, usually martensite, such microstructure depending upon the application for the steel. Since the present invention is particularly suitable in those applications where rolling contact fatigue will be experienced, the microstructure should be hard and strong. In most instances, quenching in oil maintained at a temperature of about 55° C. provides a satisfactory cooling rate to achieve such strength and hardness. Slower quenches, e.g., into molten salt, or faster quenches, e.g., into water, may be used in some circumstances. Further cooling of the quenched steel by the use of liquid nitrogen to a temperature of $-196°$ C. will reduce the amount of retained austenite, usually producing a further increase in hardness and residual stress.

More essentially, the article is immersed in a cooling medium to quench the central core of said article at a rate sufficiently fast to effectively suppress the formation of non-martensitic austenite decomposition products, thereby establishing a residual compression stress gradient proceeding from the surface region of said article to a depth of between 0.007–0.03 inches.

4. Tempering: The tempering cycle can be adjusted to suit a wide variety of needs; typically, heating to a temperature of 100°–150° C. and holding for approximately 1–2 hours is satisfactory.

EXAMPLE 1

One series of experiments was directed to an analysis of the development of compressive residual stresses in a 52100 steel. The test procedure followed was:

Strips of 52100 steel, which were spheroidize annealed, having a dimension of 3 inches long (7.62 cm)×0.5 inches wide (1.25 cm)×0.090 inches (0.23 cm) thick, were machined from roll-flattened 0.5 inch diameter wire. The nominal composition of 52100 steel is 1.0% carbon, 1.5% chromium, 0.35% manganese, 0.25% silicon and the remainder substantially iron. A total of 12 sample pieces were prepared according to the heat treat cycles indicated in Table 1; those having an asterisk were copper-plated to prevent carburization during heat treatment and thereby equivocate the prior art treatment which would not include carburization, but rather just the heat treatment at the indicated temperatures in a neutral atmosphere. Those samples which are indicated with a double asterisk had the copper plate removed after 980° C. treatment. The heat treat cycles include a variation of the heating time and the temperature. The samples also were subjected to different quenching treatments, some being an oil quench with the oil maintained at 55° C., and others including an additional quench with liquid nitrogen. Certain of the specimens were then subjected to a tempering treatment as indicated at the temperature and time periods of Table 1.

The austenitizing heat treatments were carried out in a Lindberg carburizing furnace with an integral quench tank. The gas atmosphere was generated as an endothermic gas atmosphere, enriched with methane. A measure of the carburizing rate of the furnace atmosphere was obtained by determining the weight gain of a foil of 1008 steel, 0.064 mm thick, which was inserted through a sight port into the furnace, held at the temperature for 30 minutes, then rapidly cooled. The gas mixture was adjusted prior to each of the runs so that the foil carbon content was at least 0.9 wt. pct. carbon. For most of the runs, foils were also included along with the samples. Because some air was entrained with the samples when they were charged into the furnace, the initial carburizing rate was low. For example, the foil accompanying Sample 5, austenitized for only 30 minutes contained only 0.72 wt. pct. carbon; in every other case when the austenitizing times were longer, the foils accompanying the samples contained carbon in excess of the amount needed to saturate austenite.

Following each heat treatment cycle, the residual stress distribution in each sample was measured and hardness readings were taken. The residual stress distribution is measured by progressively thinning the strips from one side only by chemical dissolution, measuring the bending of the strip and analyzing the deflection results using a modification of the method described by R. G. Treuting and W. T. Reed, Jr., Journal of Applied Physics, Vol. 22, 1951, pp. 130-134. Average hardness readings were taken for certain samples by a microhardness transverse (Knoop indentor 1 kgm load) through the surface region of the sample.

Figure 1:
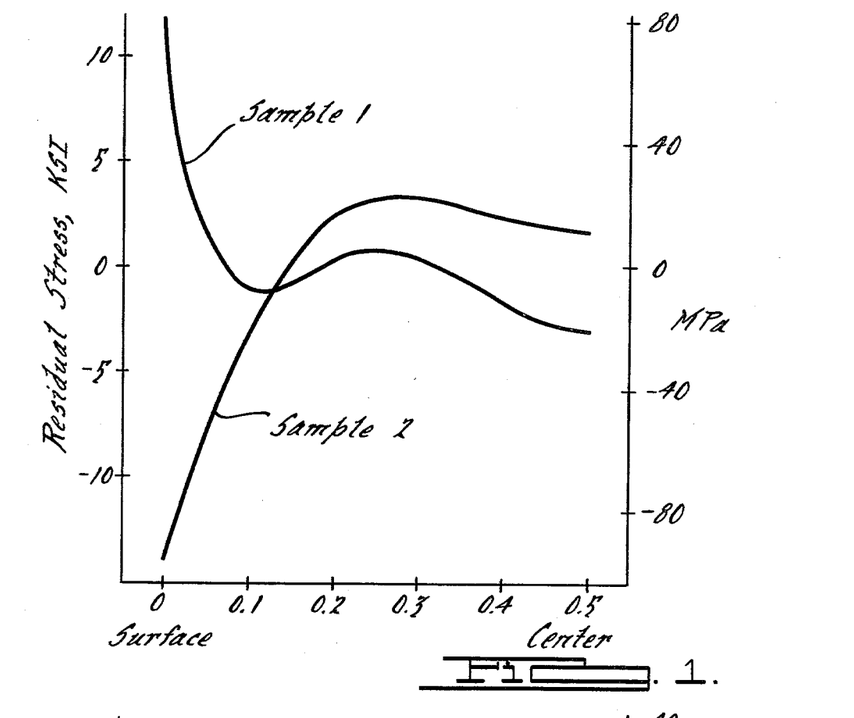
FIG. 1 is a graphical illustration of residual stress as a function of normalized distance from the surface of each of two 0.090" thick specimens, each specimen being heat treated at 850° C. for 1 hour, one being carburized and the other not.
Figure 2:
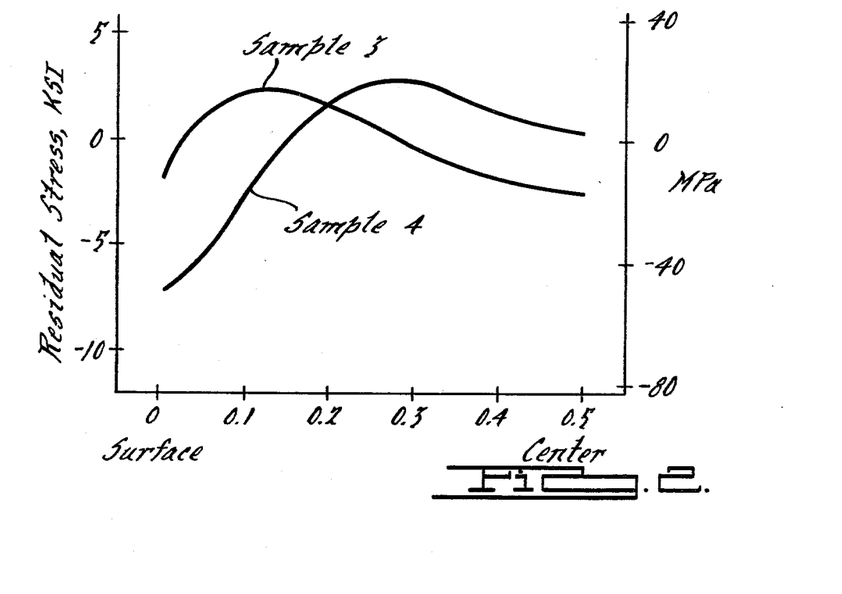
FIG. 2 is an illustration similar to FIG. 1 for two other 0.090" thick samples each treated at 875° C., one being carburized and the other not.
Figure 3:
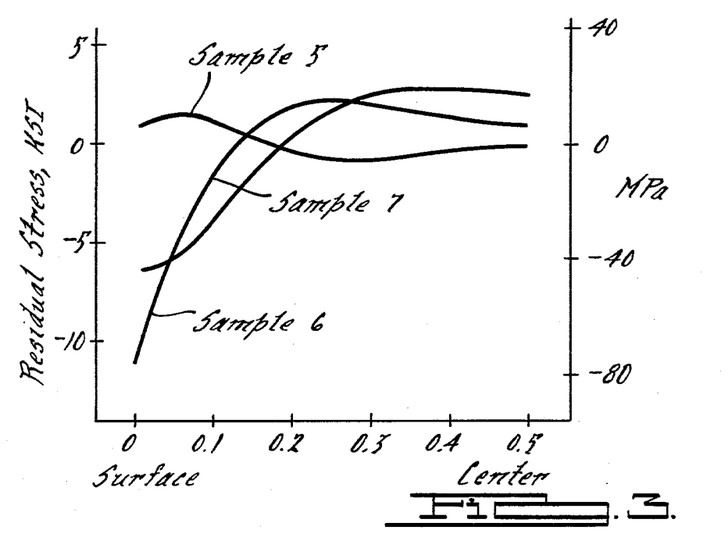
FIG. 3 is a graphical illustration of residual stress as a function of depth below the surface of the specimen, for three 0.090" thick samples, each being heat treated at 850° C. for varying periods of time in a carburizing atmosphere, quenched and tempered at 150° C. for 90 minutes.

With respect to the Samples 1 and 2, FIG. 1 shows that the plated specimen, which did not exchange carbon with the furnace atmosphere, developed a small surface tensile stress, while the unplated piece, which was carburized by the atmosphere, developed a surface compressive stress of about 15,000 psi at the surface, shown as a negative stress in FIG. 1. Without carburizing, specimens tended to develop tensile surface residual stresses; therefore, the change (which is a sum of the tensile and compressive values) in residual stress distribution produced by carburizing is more substantial than the stress distribution in carburized pieces would suggest.

Samples 3 and 4, which were austenitized at a slightly higher temperature and subjected to a liquid nitrogen quench following the oil quench, demonstrated a very slight compressive stress for the plated sample at the surface, whereas in the unplated sample, the compressive stress was approximately 7,000 psi at the surface. The depth of compressive residual stress has been increased over that of Sample 2, but the stress intensity is lowered due to the higher austenitizing temperature and the addition of the tempering treatment.

The next three Samples, 5, 6, and 7 were austenitized for 30 minutes, 1 hour and 2 hours respectively at 850° C. After oil quenching, samples were quenched in liquid nitrogen before tempering. Sample 5 was nearly free of residual stress; there was little carbon transfer from the furnace atmosphere to the specimen. The samples held for longer times (1 hour and 2 hours) developed definite compressive residual stresses at the surface. Distribution of the stresses is clearly related to the depth of carbon diffusion. The ratio of the depth at which the stress changes sign in Sample 7 to the corresponding depth in Sample 6 is 1.48; this is close to the square root of 2, the value that would be expected if the depth of the compressive stress was related to the depth of carbon penetration from the atmosphere.

Figure 6:
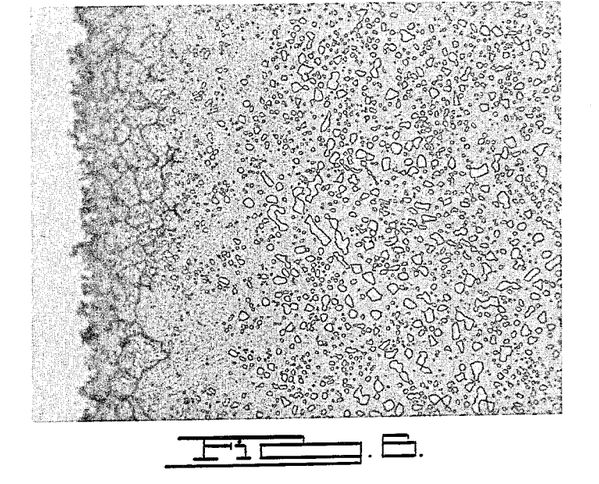
FIG. 6 is a tapered section microphotograph (1000 ×) of a specimen which, in accordance with this invention, has been austenitized for 2 hours at 850° C. and oil quenched, the microphotograph being taken of a surface zone.
Figure 7:
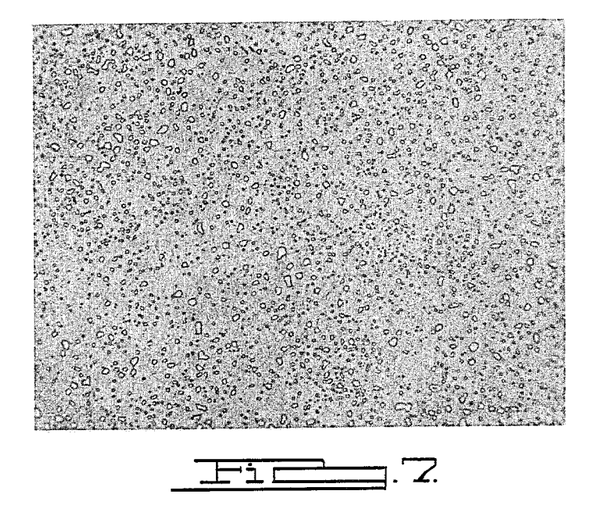
FIG. 7 is also a microphotograph (1000 ×) of the interior zone of the specimen in FIG. 6.

The distribution of primary carbides after 2 hours at 850° C. is shown in FIGS. 6 and 7 (for Sample 7) at 1000×(picral etch). These pictures are from a tapered section and polished so that apparent distances normal to the surface are magnified by a factor of about 5.5 relative to the distances tangent to the surface. In FIG. 6, grain boundary oxides are found at the specimen surface to a depth of about 0.004 mm; this is a common occurrence when heat treating chromium-bearing steels in endothermic gas atmospheres. Below the oxide is a carbide-depleted region of about 0.004 mm, probably the result of migration of the chromium to oxides. The carbon content of the austenite, however, must be high in this region. Then a zone appears containing 0.18 volume fraction of primary carbides (from point counting measurements). This zone extends from 0.008 mm to 0.07 or 0.10 mm below the surface. The microstructural features of the interior, shown in FIG. 7, demonstrate a volume fraction of primary carbides of 0.08, about half that near the surface. There seems to be no tendency to form carbide films in austenite grain boundaries in the carburized surface layer; rather the existing spheroidal carbides simply grow. The thickness of the layer under compression increases with increasing austenitizing time, while the magnitude of the surface stress decreases somewhat.

The average microhardness of the outer surface region of Sample 7 to a depth of 0.005" was determined to be 947 KHN (1 kgm load, equivalent to 68–69 $R_c$). The hardness decreased with increasing distance from the surface until the base hardness of 880 KHN (about 66–67) $R_c$) was reached at a depth of 0.008–0.010". This hardness gradient is an important aspect of the present invention and is attributed to the high carbon content of the martensite in the high carbon surface region, as well as the greater volume fraction of carbides thereat, more than offsetting the greater volume fraction of retained austenite.

Figure 4:
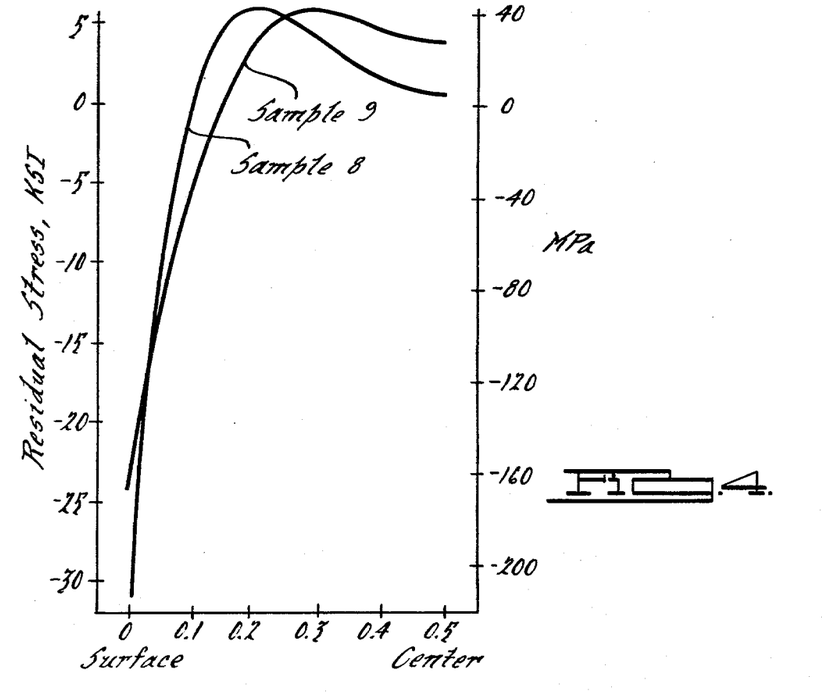
FIG. 4 is a graphical illustration of residual stress as a function of depth below the surface of the samples, the 0.070" thick samples being heat treated at 800° C. for times of 1 hour and 2 hours, respectively, in a carburizing atmosphere.

Samples 8 and 9, FIG. 4, confirm that a longer austenitizing time produces a deeper case, but a somewhat lower surface stress. This data also shows, by comparison with Sample 2, that the compressive surface stresses are higher with an 800° C. austenitizing temperature than with an 850° C. temperature.

Figure 5:
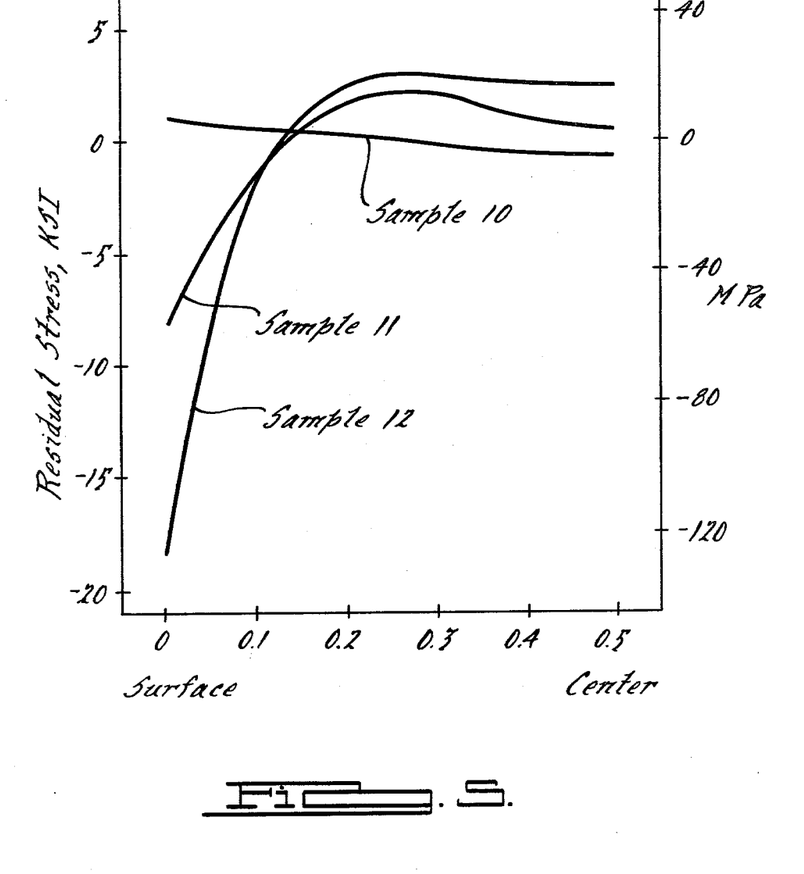
FIG. 5 is a graphical illustration of residual stress as a function of depth below the surface of the sample, for three 0.070" thick samples, the first two of which were heat treated at 980° C. for 35 minutes, cooled to develop a pearlitic microstructure, and then heated again for a period of 55 minutes at 815° C. in a carburizing atmosphere, the third sample being heat treated in a single step at 815° C. for 55 minutes in the same carburizing atmosphere.

Samples 10–12, FIG. 5, show the effect of initial carbide size on the intensity of the residual stresses developed. Reducing the carbide size increases the rate of dissolution at 815° C. Sample 10 is the baseline for comparison. Pretreating Sample 11 at 980° C., followed by an air cool, to produce more finely divided carbides, has an adverse effect on the degree to which compressive surface stresses can be developed. Thus, Sample 12, with coarse, slowly dissolving primary carbides, can be treated to produce the highest residual stress.

Average hardness values (KHN) were determined for Samples 11 and 12 at four subsurface regions as follows:

| Sample | DEPTH BELOW SURFACE | | | |
| --- | --- | --- | --- | --- |
| | 0–0.4 mm | .04–.08 mm | .08–.2 mm | Interior |
| 11 | 948 | 877 | 852 | 831 |
| 12 | 928 | 883 | 858 | 824 |

The retained austenite was measured by x-ray method on the carburized surface of Samples 11 and 12 and on their centerlines after they had been thinned to measure residual stress. In both specimens, the average surface retained austenite was 24–26%. On the centerline of Sample 11, the average measurement was 15% retained austenite, and on the centerline of Sample 12, it was 9%. These differences in retained austenite are consistent with the expected differences in dissolved carbon. The differences are also consistent with the observation that quenching carburized specimens in liquid nitrogen to lower the retained austenite tends to increase the residual stresses.

EXAMPLE 2

A second series of samples were tested to investigate the effect of differences in chemical composition. Three sample materials were obtained with the compositions set forth in Table II. Pieces of each material were subjected to a heat treatment cycle which involved heating to 1650° F. (900° C.) in a carburizing atmosphere determined as in Example 1, holding at said temperature for about 2 hours, quenching in oil having a temperature of 55° C., tempering at 300° F. (149° C.) for 2 hours, and then air cooling. Sample 13, however, was heated to 1560° F. (850° C.) with the remainder of the procedure the same (this lower temperature is necessitated by the lower alloy content). Sample 16B was subjected to a different heat treat cycle wherein the material was heated in a carburizing atmosphere, to 1750° F. (154° C.) for 2 hours, air quenched, double tempered at 300° F. (149° C.) for 2 hours, and then air cooled.

Results of the tests (see Table III) show that for Sample 15, no residual compressive stresses were developed at the surface of the article. It is theorized that this resulted from the high chromium content of the tool steel which, because of the atmosphere containing CO, caused oxidation of the chromium which set up a barrier towards carburization of the surface region. If carbon monoxide can be eliminated from the carburizing atmosphere, it may be possible to eliminate oxidation of such high chromium content and thus allow carburization to proceed with the same results generally obtained for Samples 13, 14 and 16.

Samples 14 and 16, like 13 (52100 steel) each had significant compressive stress at the surface consistent with the control of chromium content and carburizing atmosphere.

The surface hardness of Sample 14 was not measurably greater than its interior hardness; the surface layer contained 14% retained austenite while the interior had 3% retained austenite. On the other hand, while specimen 16A showed a definite increase in surface hardness, there was no measurable difference between the amount of retained austenite at the surface and in the interior. All three factors—higher surface hardness, higher surface retained austenite and surface compressive residual stress—are important characteristics of an optimized carburized layer in these steels; however, either a hardness gradient or a gradient in retained austenite content may be absent in a carburized steel that is less than optimized, provided one or more of the other factors are present. A hardness gradient or retained austenite gradient need not always exist, even though carburization has occurred and residual surface compressive stresses develop.

Examples I and II demonstrate that the distribution of residual stresses in quenched and tempered steel containing the preferred carbon content and alloy range, can be modified by controlling the carbon potential of the furnace atmosphere during austenitizing. Example I shows that by using a carburizing atmosphere for austenitizing treatments of about 1-2 hours at 815° to 850° C., with a 159° C. temper, will produce compressive residual stresses to a depth of 0.2-0.4 mm below the surface with a maximum surface compressive stress in the order of 70-135 MPa (10-20 SKI). In addition to compressive surface residual stresses, the inventive method increases the amount of retained austenite and the volume fraction of primary carbides at the surface. The increase in surface retained austenite, particularly since the increase is accomplished without coarsening the austenite grains or reducing the hardness, is beneficial to increased contact fatigue life.

For short treatments, the depth of carburizing is quite shallow. For example, in the two hour treatment of Samples 7 and 9, the depth of the compressive layer is about 0.016". The amount of metal removed in finishing the bearing components of which these substrates may be employed, after heat treatment, must be within this thickness, and preferably no more than 0.002-0.004". This is necessary to maintain the benefit of the compressive stresses.

EXAMPLE III

The rolling contact fatigue lives of 52100 steel samples were tested. The heat treatment was the same as for Sample 12, Table I, except that a tempering temperature of 175° C. was used. Group I samples were copper-plated during treatment to prevent carburization; Group II samples were unplated, therefore carburized. The test procedure employed a simulative test procedure requiring special machines such as that made by Polymet Corp., Model RFC-1 in which test bars of steel are tested to fatigue destruction. The complete test procedure is set forth more clearly in U.S. Pat. No. 4,023,988, Column 3, lines 32-68 and Column 4, lines 1-10. For the immediate test, a maximum hertzian rolling contact stress of 503 MPa (729,000 psi) was employed. The results are summarized in Table IV, the statistical significance of the results was tested by using the nonparametrical Walsh test described on pp. 83-87 of "Non-Parametric Statistics", S. Siegel, McGraw Hill, New York, 1956. The Walsh test was employed because the alternative, Johnson's Confidence Method (described in a paper by L. J. Johnson, *Industrial Mathematics*, vol. 2, 1951, pp. 1-9), is not very accurate or convenient to use at Weibull slopes over 3.0.

The net result of such statistical testing was that in 99.5% of the cases, the life of the specimen with compressive surface stresses can be expected to exceed that of conventional specimens. In fact, in those cases where enhanced compressive surface stresses are developed, there is a 50% fatigue life increase when compared to a base line group of samples which were not subjected to a carburizing treatment such as in current bearing production. The fatigue life improvement extends over the entire range from B-5 to B-50 and beyond.

It is believed that fatigue life is improved by the processing herein because of several factors; (a) residual compressive stresses at the surface, (b) more retained austenite at the surface, (c) a higher surface hardness, and (d) a larger volume fraction of carbides near the surface. All of these factors result from a carbon gradient normal to the surface, and the first two result from a gradient in dissolved carbon in austenite. Whether one of these factors, or all of them in combination, are responsible for the contact fatigue life improvement of this invention, is not known.

The mechanisms by which a dissolved carbon gradient is developed in a hypereutectoid steel were outlined in theory above [(a) increasing carbon content of the alloy system causes an increased carbon solubility in austenite and (b) slowness of carbon distribution between carbide and austenite]. These mechanisms have been illustrated by the experiments described in the first two examples. In chromium bearing hypereutectoid steels both mechanisms can operate because:

(1) for low alloy compositions, as the carbon content of the Cr-Fe-C system increases, the solubility of carbon in austenite increases, and (2) relatively large spheroidized carbides, rich in chromium, are slow to dissolve at low austenitizing temperatures. In other systems, the Mn-Fe-C system for example, the first mechanism would not be expected to operate, because, according to R. Benz, J. F. Elliott and J. Chipman, *Metallurgical Transactions*, vol. 4, 1973, pp. 1975-86, increasing the carbon content of the Mn-Fe-C system does not significantly increase the solubility of carbon in austenite for hypereutectoid steels. The second mechanism would operate; thus, shallow surface compressive residual stresses of some magnitude could in theory be developed by short time austenitizing treatments in a carburizing atmosphere. In plain carbon hypereutectic steels, carbides dissolve so rapidly that neither mechanism could be expected to produce surface compressive residual stresses.

TABLE 1

| Sample | Summary of Experimental Results |
|---|---|
|  | Heat Treatment |
| 1* | A-850° C./1 hr; OQ |
| 2 | Same |
| 3* | A-875° C./1 hr; OQ; LNQ; T-100° C./1.5 hrs |
| 4 | Same |
| 5 | A-850° C./30 min; OQ; LNQ; T-150° C./1.5 hrs |
| 6 | A-850° C./1 hr; OQ; LNQ; T-150° C./1.5 hrs |
| 7 | A-850° C./2 hrs; OQ; LNQ; T-150° C./1.5 hrs |
| 8 | A-800° C./1 hr; OQ |
| 9 | A-800° C./2 hrs; OQ |
| 10* | A-980° C./35 min; AC; A-815° C./55 min; OQ; T-150° C./1 hr |
| 11** | Same |
| 12 | A-815° C./55 min; OQ; T-150° C./1 hr |

*Copper-plated specimens
**Copper plate removed after 980° C. treatment
A: Austenitize
OQ: Quenched in 55° C. oil
LNQ: Quenched in liquid nitrogen
T: Temper
AC: Air cooled

TABLE II

| Sample | C | Mn | Si | Cr | V | W | Mo |
|---|---|---|---|---|---|---|---|
| 13 | 1.00 | 0.35 | 0.25 | 1.50 |  |  |  |
| 14 | 1.00 | 0.60 | 0.25 | 5.00 | 0.25 |  | 1.00 |
| 15 | 1.50 | 0.30 | 0.25 | 12.00 | 0.60 |  | 0.80 |
| 16 | 0.85 | 0.30 | 0.30 | 4.00 | 2.00 | 6.00 | 5.00 |

TABLE III

| Sample | Stress, psi | Surface Residual | Depth of compressive stress | Hardness Surface | Hardness Center |
|---|---|---|---|---|---|
| 13 | 52100 | 6,400 psi Compressive | .015" | 68 $R_c$ | 66 $R_c$ |
| 14 | A2 | 10,600 Compressive | 0.012" | 61/62 $R_c$ | 61/62 $R_c$ |
| 15 | D2 | 7100 Tensile | — | not determined | |
| 16A | M2 | 35,000 Compressive | 0.021" | 61/62 $R_c$ | 54/55 $R_c$ |
| 16B | M2 | 28,000 Compressive | 0.029" | 59/60 $R_c$ | 57 $R_c$ |

TABLE IV

Estimates of Characteristic Fatigue Life Parameters

| | Rolling Contact Fatigue | Weibull | Fatigue Life (Millions of Stress Cycles)* | | | | | | |
|---|---|---|---|---|---|---|---|---|---|
| | | | B-10 | | | B-50 | | | |
| Sample | Group | Slope | Low | Median | High | Low | Median | High | Mean |
| 3 | I | 3.333 | 2.15 | 3.17 | 4.68 | 4.69 | 5.58 | 6.65 | 5.59 |
| 5 | II | 3.39 | 3.21 | 4.71 | 6.90 | 6.92 | 8.21 | 9.75 | 8.22 |
| Ratio II/I | | | 1.49 | 1.49 | 1.47 | 1.47 | 1.47 | 147 | 1.47 |

*Low and High Values corresond to 90 ptc. confidence band limits.

We claim:

1. A method of developing compressive residual stresses in the surface region of a high carbon steel alloy article, said method comprising:
   (a) constituting said steel alloy article to contain 0.8-1.6% carbon, 0.2-5% chromium, and 0-20% alloying ingredients selected from the group consisting of manganese, vanadium, molybdenum, tungsten, silicon, the remainder being iron;
   (b) heating said article to a temperature of 800°-950° C. (1472°-1742° F.) for 1-2.5 hours in a carburizing atmosphere effective to generate a differential in retained austenite, primary carbides and carbon between the surface region and core region of said article; and
   (c) immersing said article in a cooling medium to quench the central core of said article at a rate sufficiently fast to effectively suppress the formation of non-martensitic austenite decomposition products, thereby establishing a residual compressive stress gradient proceeding from the surface region of said article to a depth between 0.007-0.03 inches, the residual compressive stress being in the range of 5-40 Ksi.

2. The method as in claim 1, in which the carburizing atmosphere of step (b) is constituted to be endothermic gas containing 3-10% methane.

3. The method as in claim 1, in which said article is constituted by having 7% alloying ingredients with about 5% Cr, so that when said heat treatment is carried out, at about 1650° F., a retained austenite gradient is established.

4. The method as in claim 1, in which said article is constituted with about 17.5% alloying ingredients, with about 4% Cr, so that when heat treatment at about 1650° F. is carried out, a hardness gradient is established.

5. The method as in claim 1, in which step (c) is comprised of quenching to room temperature, and then additionally quenching in liquid nitrogen.

6. The method as in claim 4, in which the hardness gradient provides a differential between the hardness of said core and the surface region of at least 2 $R_c$.

7. The method as in claim 3, in which the retained austenite gradient provides a differential between the core and surface region austenite of at least 10%.

8. The method as in claim 1, in which said heating is carried out at a temperature level of 815° C. for a period of about 1 hour, and the carbon potential of said carburizing atmosphere is regulated to be sufficiently high to saturate a 0.0025" thick iron foil in 30 minutes.

9. The method as in claim 1, in which the resulting article possesses a resistance to bending fatigue due to compressive residual surface stresses induced by a gradient in dissolved carbon of at least 10,000 psi in the surface region thereof and tensile stresses in the core thereof.

10. The method as in claim 1, in which the resulting article is characterized by resistance to rolling contact fatigue having a B10 fatigue life of at least 4.5 million stress cycles at a maximum hertzian contact stress of 729,000 psi.

11. The method as in claim 1, in which said steel is constituted to contain 1%C, 1.05% Cr, 0.35% Mn, 0.25 Si and the remainder Fe.

12. The method as in claim 1, in which said alloying ingredients, other than chromium, are present in an amount of at least 0.50%.

13. The method as in claim 1, in which said heated and quenched article is subjected to a tempering treatment at 100°–300° C. for 1–2 hours.

14. A high carbon steel alloy article having gradients of compressive residual stress, and at least one of a carbon gradient and hardness gradient proceeding from the surface region of said article to its core, said article being characterized by a microstructure consisting essentially of tempered martensite, retained austenite and a carbide phase, said article having a chemical content consisting essentially of 0.8–1.6% carbon, 0.75-25% alloying ingredients including 0.2–5% chromium, the remainder being essentially iron, said article having a compressive residual stress level at its surface region of at least 10,000 psi, and tensile stresses at the article core, said article having a hardness differential between its surface and core of at least 2.0 $R_c$, and a volume fraction of primary carbides at its surface region of at least 0.18.

15. The steel alloy article as in claim 14, which is further characterized by a B10 rolling contact fatigue life of at least 4.5 million stress cycles, and a B50 life of at least 8.0 million stress cycles with a hertzian contact stress of 729,000 psi.

16. The steel alloy article as in claim 14, in which the volume fraction of retained austenite is about 25% at the surface.

17. The steel alloy article as in claim 14, in which the region of said article extending from the surface to 0.004 mm contains oxides in the grain boundaries, the region from 0.004 mm–0.008 mm is carbide depleted, and the region from 0.008–0.1 mmm contains 0.18 volume fraction of carbides.

18. The steel alloy article as in claim 14, which is further characterized by resistance to subsurface crack initiation at hard inclusions and the resistance to surface initiated cracking as a result of the high compressive stress distribution in its surface region.

19. A method of making bearing elements comprising: (a) shaping a body of SAE 52100 steel into a desired bearing configuration, (b) heating said body in a carburizing atmosphere to a temperature of about 815° C. for about 1 hour, (c) quenching said heated body in oil maintained at about 55° C., (d) tempering said body at 150° C. for about 1.5 hours, and (e) finish grinding said heat treated product to a depth of less than 0.005", said resultant bearing being characterized by a microstructure consisting essentially of tempered martensite, a primary carbide phase which is at least 0.18 at its surface region and a retained austenite volume fraction of about 25% at the surface.

20. The method as in claim 19, in which step (c) is further followed by an additional quenching operation employing liquid nitrogen.

21. The method as in claim 19, in which the resultant bearing body is characterized by an average B10 contact fatigue life of at least 4.5 million stress cycles, and an average B50 life of at least 8.0 million stress cycles at a maximum hertzian contact stress of 729,000 psi.

22. In a method for preparing bearing components wherein a hot-formed shape of low alloy steel containing carbon in the range of 0.8–1.5% and containing alloying ingredients in an amount to achieve a hardening response from heat treatment throughout said shape, said alloying ingredients being selected from a group consisting of Cr, Mn, Ni, Cu and Mo, said shape being subjected sequentially to a spheroidizing-anneal treatment, a rough forming treatment, and a hardening austenitizing treatment, the improvement comprising: (a) carrying out said hardening-austenitizing treatment in a carburizing atmosphere having a carbon potential sufficiently high to saturate a 0.0025" thick iron foil in 30 minutes and at a temperature level of between 800°–900° C. for a period of time between 1–2.5 hours to establish both carbon additions and an increase in the primary carbide and retained austenite phases of said steel in the surface layers of the steel; (b) establishing a compressive residual stress gradient in said steel by quenching said steel at a rate such that the core experiences a cooling rate of at least 300° F. per second when it is passing through the temperature zone of 1300°–700° F., said resultant article having a compressive stresses in the surface region which range between 5–40 KSI and tensile stresses in its core.

* * * * *